United States Patent [19]

Shigemoto

[11] Patent Number: 5,077,123

[45] Date of Patent: Dec. 31, 1991

[54] LAMINATED FILM HAVING POLY(4-METHYL-1-PENETENE) BASE LAYER

[75] Inventor: Hiromi Shigemoto, Iwakuni, Japan

[73] Assignee: Mitsui Petrochemical Industries, Ltd., Tokyo, Japan

[21] Appl. No.: 197,957

[22] Filed: May 24, 1988

[30] Foreign Application Priority Data

May 28, 1987 [JP] Japan ............................. 62-130012

[51] Int. Cl.$^5$ .......................... B32B 7/12; B32B 27/08
[52] U.S. Cl. ............................ 428/349; 428/516; 428/520; 428/518; 428/483; 428/476.9; 428/476.1; 428/513; 428/514
[58] Field of Search ............... 428/516, 518, 520, 349

[56] References Cited

U.S. PATENT DOCUMENTS

| 4,105,118 | 8/1978 | Williams, Jr. et al. | 428/516 |
| 4,632,959 | 12/1986 | Nagano | 525/70 |
| 4,822,840 | 4/1989 | Kioka et al. | 428/516 |

OTHER PUBLICATIONS

Patent Abstracts of Japan, Unexamined Applications, C Filed, vol. 10, No. 13, p. 11 C 323 (Jap. Pub. Patent Appln. 60-166310).
Derwent Publications, Ltd., Database WPIL, No. 86-079553 Abstract of Jap. Publ. Patent Appln. No. 86-079553.
Derwent Publications, Ltd., Database WPI, No. 80-85103 Abstract of Jap. Publ. Patent Appln. No. 55-132244.

Primary Examiner—P. C. Sluby
Attorney, Agent, or Firm—Sherman and Shalloway

[57] ABSTRACT

A laminated film comprising
(A) a base layer of a polymer based on 4-methyl-1-pentene;
(B) provided on at least one side of the base layer, an interlayer of an $\alpha$-olefin copolymer comprising 10–85 mole % of propylene, 3–60 mole % of 1-butene and 10–85 mole % of $\alpha$-olefin having 5 or more carbon atoms, a degree of crystallininty of the copolymer as measured by X-ray diffractometry being 20% or less; and
(C) provided on the interlayer, a heat-sealable layer of an $\alpha$-olefin polymer material predominantly comprising an $\alpha$-olefin having 2 to 4 carbon atoms.

8 Claims, No Drawings

LAMINATED FILM HAVING POLY(4-METHYL-1-PENETENE) BASE LAYER

BACKGROUND OF THE INVENTION

1. Field of the Invention

The present invention relates to a laminated film having a high heat-sealability and comprising a substrate of poly(4-methyl-1-pentene).

2. Description of the Related Art

The good transparency, heat resistance, chemical resistance and the like, of poly(4-methyl-1-pentene) have led to the application thereof to laboratory ware such as beakers or graduated cylinders, syringes, cells for optical measurement, trays for microwave ovens, and a baking carton comprising a paper coated therewith, etc. But although poly(4-methyl-1-pentene) has a high melting point and a good heat resistance, it has a disadvantage in that it has a poor heat-sealability. The most generally used method for improving this heat-sealability is by lamination of the poly(4-methyl-1-pentene) with a resin such as polyethylene or polypropylene having a good heat-sealability and a lower melting point. But, poly(4-methyl-1-pentene) and polyethylene or polypropylene do not adhere to each other, although they are both a polyolefin, and thus a product prepared by laminating these elements cannot be practically employed.

Further, if the poly(4-methyl-1-pentene) film is laminated with a polyethylene film by applying an adhesive based on a urethane as an anchor coating agent, the heat-sealability is not greatly improved because the poly(4-methyl-1-pentene) film has a poor surface-wettability, and thus the resulting laminated film has a low adhesive strength.

The assignee of the present application has already filed Japanese Patent Application No. 59-1387 Unexamined Publication No. 60-145844) which discloses that a laminated film having an improved adhesive strength and a high heat-sealability can be obtained by employing a particular random copolymer of propylene and α-olefin as an adhesive layer for the lamination of poly(4-methyl-1-pentene) film and a polyethylene or polypropylene film.

SUMMARY OF THE INVENTION

The present inventor has now found that an adhesive strength of a laminated film comprising a poly(4-methyl-1-pentene) base layer can be further improved by employing a particular, α-olefin copolymer as disclosed in Japanese Unexamined Patent Publication No. 60-166310 filed by the same assignee as for the present application, as an adhesive layer.

Accordingly, the object of the present invention is to provide an improved laminated film which comprises (A) a base layer of a polymer based on 4-methyl-1-pentene;

(B) an interlayer of an α-olefin copolymer comprising 10–85 mole % of propylene, 3–60 mole % of 1-butene and 10–85 mole % of o-olefin having 5 or more carbon atoms, a degree of crystallinity of the copolymer, as measured by X-ray diffractometry, being 20% or less, provided on at least one side of the base layer; and (C) a heat-sealable layer of an α-olefin polymer material predominantly comprising an α-olefin having 2 to 4 carbon atoms provided on the interlayer.

Other objects and advantages of the present invention will be apparent from the following description.

DESCRIPTION OF THE PREFERRED EMBODIMENTS

As the polymer constituting the base layer (A), there may be employed a homopolymer of 4-methyl-1-pentene, or a copolymer generally comprising 85 mole % or more of 4-methyl-1-pentene and 15 mole % or less of other α-olefins having 2 to 20 carbon atoms such as ethylene, propylene, 1-butene, 1-hexene, 1-octene, 1-decene, 1-tetradecene, 1-octadecene, or the like; the melt flow rate [MFR5; load 5 kg; 260° C.] of the polymer based on 4-methyl-1-pentene preferably ranging from 0.5 to 200 g/10 min. The polymer having a melt flow rate of less than 0.5 g/10 min has a high melt viscosity, and thus a poor moldability, whereas a polymer having a melt flow rate of more than 200 g/10 min has a low melt viscosity, and thus a poor moldability and a low mechanical strength.

The α-olefin copolymer constituting the interlayer (B) comprises 10–85 mole %, preferably 15–70 mole %, more preferably 25–55 mole %, of propylene, 3–60 mole %, preferably 5–50 mole %, more preferably 10–40 mole %, of 1-butene and 10–85 mole %, preferably 15–70 mole %, more preferably 20–60 mole %, of α-olefin having 5 or more, preferably 6–12, carbon atoms, and a degree of crystallinity of the copolymer as measured by X-ray diffractometry of 20% or less, preferably 15% or less, more preferably 10% or less. As an example of the α-olefin having 5 or more carbon atoms, there may be mentioned 1-pentene, 3-methyl-1-butene, 1-hexene, 4-methyl-1-pentene, 3-methyl-1-pentene, 1-heptene, 1-octene, 1-decene, 1-dodecene, or the like.

When the content of propylene is less than 10 mole % or more than 85 mole %, that of 1-butene is less than 3 mole % or more than 60 mole %, or that of the α-olefin is less than 10 mole % or more than 85 mole % in the α-olefin copolymer, the adhesive strength to the base layer (A) is weakened. Further, the α-olefin copolymer having a degree of crystallinity as measured by X-ray diffractometry of more than 20% has a low adhesiveness to the base layer (A).

In the present invention, the degree of crystallinity of the α-olefin copolymer as measured by X-ray diffractometry is determined as follows:

A sample is compression-molded for 10 minutes under a condition of 30 kg/cm$^2$ at 280° C, cooled for 5 minutes in a water-cooled press (pressure: 30 kg/cm$^2$) at 23° C., and then a specimen (2 cm×4 cm×1 mm) is molded. An X-ray diffraction curve of the specimen is measured at 5°–31° of the diffraction angle (2θ) with X-ray diffractometer equipped with a rotating anode and a copper target (RU-300; Rigaku Denki K.K.).

Non-crystalline and crystalline portions are divided by drawing a base line between 6° and 30°, and the crystalline portion is determined by a percentage by weight.

The α-olefin copolymer constituting the interlayer (B) used in the present invention has an intrinsic viscosity [η] (measured at 135° C. in decalin) of 0.5 to 6 dl/g, preferably 0.6 to 5 dl/g, more preferably 1.0 to 4 dl/g. An α-olefin copolymer having an intrinsic viscosity outside of that scope may exhibit a low moldability.

Regarding the α-olefin copolymer of the interlayer (B), preferably the matter insoluble in the boiling n-heptane is 5.0% by weight or less and the matter soluble in acetone at 25° C. is 5.0% by weight or less. More preferably, the matter insoluble in boiling n-heptane is 4.0% by weight or less, and the matter soluble in acetone at 25° C. is 2.5% by weight or less. When the matter insoluble in boiling n-heptane is more than 5% by weight, the transparency of the α-olefin copolymer is reduced, or a defect such as a fish-eye can appear in a film cast therefrom. When the matter soluble in acetone is more than 3.0% by weight, the surface of the copolymer film becomes tacky, and thus the adhesive to the base layer (A) is reduced.

In the present invention, the matter insoluble in boiling n-heptane and the matter soluble in acetone at 25° C. with respect to the α-olefin copolymer are determined as follows:

The matter insoluble in n-heptane is determined by introducing a small specimen (about 1 mm × 1 mm × 1 mm) with glass beads in a cylindrical glass filter and extracting for 14 hours in a Soxhlet apparatus. The percentage by weight of the insoluble matter is calculated after weighing the soluble or insoluble part.

The matter soluble in acetone at 25° C. is determined by dissolving 15 g of the sample in 250 ml of n-decane at 130° C., pouring the resulting solution into 500 ml of acetone, precipitating a polymer insoluble in acetone, recovering a filtrate by filtration, adding 300 ml of water to the filtrate, separating a n-decane layer from a water-acetone layer by a separating funnel, and concentrating the n-decane layer.

The α-olefin copolymer of the interlayer (B), which has the above properties and can be used in the present invention, can be prepared from random copolymerization of propylene, 1-butene, and α-olefin by using a catalyst comprising (i) a solid titanium catalyst component prepared by treating (a) a highly active solid titanium catalyst component comprising a magnesium compound, a titanium compound and an electron donor with (b) a halogenated hydrocarbon, (ii) an organic aluminium compound component, and (iii) an electron donor component comprising a silicon compound. The process for manufacturing this catalyst is described in, for example, Japanese Unexamined Patent Publication No. 56-811 and No. 58-83006, the disclosures of which are incorporated herein by reference. Further, the polymerization conditions of the α-olefin copolymer of the interlayer (B) is described in, for example, Japanese Unexamined Patent Publication No. 60-166310; the disclosure of which is incorporated herein by reference.

The α-olefin polymer material constituting the heat-sealable layer (C) may be a crystalline polymer predominantly comprising ethylene, propylene or 1-butene. More particularly, the α-olefin polymer material may be a homopolymer of ethylene, propylene or 1-butene; a copolymer of ethylene, propylene or 1-butene with a minor component of other α-olefin having 2–20 carbon atoms or vinyl compound such as vinyl acetate, vinyl chloride, acrylic acid, methacrylic acid or styrene; a graft copolymer thereof modified with an unsaturated carboxylic acid or a derivative thereof such as maleic anhydride, maleic acid or acrylic acid; or a mixture thereof.

Polyethylenes as an example of the α-olefin polymer material include high-pressure low density polyethylene (so-called LDPE), ethylene/propylene copolymer, ethylene/1-butene copolymer, ethylene/4-methyl-1-pentene copolymer, ethylene/1-hexene copolymer, high density polyethylene (so-called HDPE), ethylene/vinyl acetate copolymer, ethylene/acrylic acid copolymer and the like. Because of their good transparency and heat-sealability at a low temperature, LDPE, ethylene/α-olefin copolymers, and ethylene/vinyl acetate copolymer are preferable. Among the above polyethylenes, those having a density of 0.910 –0.960 and a melting point (Tm: ASTM D3418) of 100° to 135° C. are particularly preferable. Further, the melt flow rate thereof (MFR3 ASTM D1238, E) is not limited, although it is preferably 0.01 to 30 g/10 min, more preferably 0.1 to 10 g/10 min, in view of the moldability thereof.

As an example of the α-olefin polymer material, polypropylenes including: polypropylene (propylene homopolymer); propylene random copolymers comprising generally 90 mole % or more, preferably 95 mole % or more of propylene, for example, propylene/ethylene random copolymer, propylene/ethylene/1-butene random copolymer, propylene/ethylene/1-butene random copolymer, or propylene/1-butene random copolymer; or propylene/ethylene block copolymers comprising generally 5–30 mole % of ethylene are preferable. Due to their good transparency, homopolymer and random copolymer are preferable. Particularly, a random copolymer having a melting point (Tm: ASTM D3418) of 130° to 140° C. is preferable, in view of a good heat-sealability. The melt flow rate thereof is not limited, although it is preferably 0.5 to 30 g/10 min, more preferably 0.5 to 10 g/10 min, in view of the moldability thereof. As an example of the α-olefin polymer material, poly 1-butenes including: homopolymers of 1-butene, -butene/ethylene copolymers, 1-butene/propylene copolymers, or 1-butene/4-methyl-1-pentene copolymers are preferable. The melt flow rate thereof (MFR$_3$: ASTM D1238, E) is not limited, although it is preferably 0.01 to 100 g/10 min, more preferably 0.03 to 30 g/10 min, in view of the moldability thereof.

The laminated film of the present invention comprises the base layer (A) of the polymer based on 4-methyl-1-pentene; the interlayer (B) of the α-olefin copolymer provided on at least one side of the base layer (A); and the heat-sealable layer (C) of the α-olefin polymer material provided on the interlayer (B).

The laminated film according to the present invention may be produced by various known methods; for example, a method comprising previously molding the film of the polymer based on 4-methyl-1-pentene, and thereafter, extrusion-coating the α-olefin copolymer and the α-olefin polymer material thereon; a method comprising previously molding the film of the polymer based on 4-methyl-1-pentene, and thereafter, extrusion-laminating the α-olefin copolymer with the film of the α-olefin polymer material; or a method comprising coextruding the polymer based on 4-methyl-1-pentene, the α-olefin copolymer and the α-olefin polymer material through a multilayer die having a multilayer structure (at least three layers) with the α-olefin copolymer being the interlayer. The coextrusion method is preferable because the operation is simple and a laminated film having a good adhesiveness between layers can be produced. Two typical coextrusion methods are known; namely, a T-die method using a flat die, and an inflation method using a circular die. As the flat die, either a single-manifold type using a black box or a multi-manifold type may be used, and any known die may be used in the inflation die.

The thickness of each layer in the laminated film according to the present invention is not limited. Although the base layer (A) preferably has a thickness of 10–100 μm, more preferably 10–50 μm, the interlayer (B) preferably has a thickness of 5–50 μm, more preferably 10–30 μm and the heat-sealable layer (C) preferably has a thickness of, 10–100 μm, more preferably 10–50 μm.

Any laminated film having the base layer (A) of the polymer based on 4-methyl-1-pentene, the interlayer (B) of the α-olefin copolymer and the heat-sealable layer (C) of the α-olefin polymer material is encompassed in the scope of the present invention, and therefore, the laminated film according to the present invention includes a film comprising the base layer (A) carrying, on both sides thereof, the heat-sealable layers (C) via the interlayers (B). Further, the laminated film according to the present invention may further carry thereon a gas barrier layer comprising a resin based on polyvinylidene chloride; polyvinyl alcohol; saponified copolymer of ethylene/vinyl acetate; polyamide; polyester; paper; or aluminum foil or the like.

In all of the base layer (A), the interlayer (B), and the heat-sealable layer (C), constituting the laminated film of the present invention, various additives usually employed in a polyolefin, such as a weathering agent, heat stabilizer, antistatic agent, antifogging agent, antiblocking agent, slip agent, lubricant, pigment, dyestuff, antisticking agent, nucleating agent or the like, can be incorporated, so long as such incorporation does not affect the purpose of the present invention. In the heat-sealable layer (C), an ethylene/α-olefin copolymer such as ethylene/propylene copolymer or ethylene/1-butene copolymer, or ethylene/vinyl acetate copolymer, etc. which has a little or no crystallizing property may be incorporated to improve the heat-sealability.

Because the laminated film according to the present invention has not only a good heat resistance, transparency, surface gloss, water repellency and the like due to poly(4-methyl-1-pentene), but also an improved heat-sealability, it is preferable for use as a wrapping material for various foods such as vegetables, confectionery, meat, bread, or sea food.

EXAMPLES

The present invention now will be further illustrated by, but is by no means limited to, the following Examples.

EXAMPLE 1

4-methyl-1-pentene/1-decene copolymer [density: 0.835 5 g/cm$^3$, MFR$_5$: 26 g/10 min] (referred to hereinafter as "MP-I"), propylene/1-butene/4-methyl-1-pentene [propylene content: 36 mole %, 1-butene content: 14 mole %, 4-methyl-1-pentene content: 50 mole %, glass transition temperature (Tg): 5° C., density (D): 0.860 g/cm$^3$, MFR: 0.88 g/10 min, degree of crystallinity measured by X-ray: 1.2%] (referred to hereinafter as "PBM-I"), and high-pressure polyethylene [melting point (Tm): 105° C.] (referred to hereinafter as "LDPE-I") were melted in 40 mmφ extruder (cylinder temperature: 270° C.), 40 mmφ extruder (cylinder temperature: 250° C.) and 40 mmφ extruder (cylinder temperature: 250° C.), respectively, extruded through a coathanger die (die temperature: 260° C.) of three-layer T-die film extruder with the PBM-I as the interlayer, and cooled to obtain a coextruded three-layer film having 30 μm of 4MPI, 20 μm of PBM-I and 30 μm of LDPE-I. The properties thereof were evaluated by the following methods:

Adhesive Strength (g/15 mm)

A specimen (width: 15 mm) was cut, and a crosshead speed of up to 200 mm/min for peeling was applied to two layers. The strength recorded is the speed at which the layers were peeled.

Peel Strength of Heat-Sealed Portion (g/15 mm)

A laminated film was put on the other laminated film in such a way that the heat-sealable layers (C) thereof were brought into contact with each other. Heat-sealing was carried out for 1 second at 120° C. or 170° C. under a pressure of 2 kg/cm$^2$ with a silver bar (width: 10 mm) and the whole was allowed to cool. A specimen (width: 15 mm) was cut, and a crosshead speed of up to 200 mm/min for peeling was applied to the heat-sealed portion. The strength recorded is the speed at which the portion was peeled.

The result is shown in Table 1.

EXAMPLE 2

The procedure of the above Example 1 was repeated, except that propylene/1-butene/4-methyl-1-pentene copolymer [propylene content: 46 mole %, 1-butene content: 18 mole %, 4-methyl-1-pentene content: 36 mole %, glass transition temperature (Tg): 23° C., density (D): 0.847 g/cm$^3$, MFR: 1.2 g/10 min, degree of crystallinity measured by X-ray: 4.3%] (referred to hereinafter as "PBM-II") was used instead of PBM-I as the interlayer. The result is shown in Table 1.

EXAMPLE 3

The procedure of the above Example 1 was repeated, except that propylene/1-butene/4-methyl-1-pentene copolymer [propylene content: 44 mole %, 1-butene content: 28 mole %, 4-methyl-1-pentene content; 28 mole %, glass transition temperature (Tg): 170° C., density (D): 0.851 g/cm$^3$, MFR: 1.5 g/10 min, degree of crystallinity measured by X-ray: 3.3%] (referred to hereinafter as "PBM-III") was used instead of PBM-I as the interlayer. The result is shown in Table 1.

EXAMPLE 4

The procedure of the above Example 1 was repeated, except that propylene/ethylene random copolymer [density: 0.91 g/cm$^3$, MFR: 5 g/10 min, and Tm: 140° C.] (referred to hereinafter as "PP-I") was used instead of "LDPE-I", and the cylinder temperature of the extruder for "PP-I" was 270° C. The result is shown in Table 1.

COMPARATIVE EXAMPLE 1

The procedure of the above Example 1 was repeated, except that propylene/1-butene random copolymer [propylene content: 71 mole %, melting point: 110° C., and MFR: 7.0 g/10 min] (referred to hereinafter as "PBR-I") was used instead of "PBM-I" as the interlayer. The results are shown in Table 1.

TABLE 1

| Example | Construction (thickness: μm) | | | Adhesive strength (g/15 mm) | | Peel strength of heat sealed portion[1] | |
|---|---|---|---|---|---|---|---|
| | Outer layer | Inter- layer | Inside layer | Outer layer/ interlayer | Interlayer/ inside layer | 120° C. | 170° C. |
| 1 | MP-I (30) | PBM-I (20) | LDPE-I (30) | not peeled | not peeled | 2300 | N.D.[2] |
| 2 | MP-I (30) | PBM-II (20) | LDPE-I (30) | " | " | 2200 | " |
| 3 | MP-I (30) | PBM-III (20) | LDPE-I (30) | " | " | 2100 | " |
| 4 | MP-I (30) | PBM-I (20) | PP-I (30) | " | " | N.D.[2] | 2600 |
| Comparative Example 1 | MP-I (30) | PBR-I (20) | LDPE-I (30) | 160 g | " | 900 | N.D.[2] |

[1] Inside layers of two films were heat-sealed.
[2] not determined

Although the present invention has been described with reference to specific embodiments, various changes and modifications obvious to those skilled in the art are deemed to be within the spirit, scope and concept of the invention.

I claim:

1. A laminated film comprising
  (A) a base layer of a polymer based on 4-methyl-1-pentene;
  (B) provided on at least one side of the base layer, an interlayer of an α-olefin copolymer comprising 10-85 mole % of propylene, 3-60 mole % of 1-butene and 10-85 mole % of α-olefin having 5 or more carbon atoms, a degree of crystallinity of the copolymer as measured by X-ray diffractometry being 20% or less; and
  (C) provided on the interlayer, a heat-sealable layer of an α-olefin polymer material predominantly comprising an α-olefin having 2 to 4 carbon atoms.

2. A laminated film according to claim 1, wherein. the polymer constituting the base layer comprises 85 mole % or more of 4-methyl-1-pentene and 15 mole % or less of other α-olefin having 2 to 20 carbon atoms.

3. A laminated film according to claim 1, wherein the interlayer serves as an adhesive layer between the base layer and the heat-sealable layer.

4. A laminated film according to claim 1, wherein the α-olefin copolymer constituting the interlayer comprises 15-70 mole % of propylene, 5-50 mole % of 1-butene and 15-70 mole % of α-olefin having 5 or more carbon atoms, and the degree of crystallinity thereof is 15% or less.

5. A laminated film according to claim 4, wherein the α-olefin having 5 or more carbon atoms is selected from the group consisting of 1-pentene, 3-methyl-1-butene, 1-hexene, 4-methyl-1-pentene, 3-methyl-1-pentene, 1-heptene, 1-octene, 1-decene and 1-dodecene.

6. A laminated film according to claim 1, wherein the α-olefin polymer material constituting the heat-sealable layer is selected from the group consisting of a homopolymer of ethylene, propylene or 1-butene; a copolymer of ethylene, propylene or 1-butene with a minor component of other α-olefin having 2-20 carbon atoms or vinyl compound; a graft copolymer thereof modified with an unsaturated carboxylic acid or a derivative thereof; and a mixture thereof.

7. A laminated film according to claim 1, further comprising a gas barrier layer.

8. A laminated film according to claim 1, wherein the base layer carries, on both sides thereof, the heat-sealable layers coated on the interlayers.

* * * * *